United States Patent
Morrow et al.

(10) Patent No.: US 6,563,618 B1
(45) Date of Patent: May 13, 2003

(54) POST CONNECTION DUAL IRDA PORT POWER MANAGEMENT

(75) Inventors: Neil G. Morrow, McKinney, TX (US); Brent A. Lawson, Van Alstyne, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/212,133

(22) Filed: Dec. 15, 1998

Related U.S. Application Data

(60) Provisional application No. 60/068,588, filed on Dec. 23, 1997.

(51) Int. Cl.[7] ............................................. H04B 10/00
(52) U.S. Cl. ..................... 359/152; 359/153; 359/159; 359/172; 359/110
(58) Field of Search ................................ 359/152, 153, 359/110, 159, 172

(56) References Cited

U.S. PATENT DOCUMENTS

| | | | | |
|---|---|---|---|---|
| 5,343,319 A | * | 8/1994 | Moore | 359/152 |
| 5,539,564 A | * | 7/1996 | Kumozaki et al. | 359/161 |
| 5,617,236 A | * | 4/1997 | Wang et al. | 359/172 |
| 5,706,110 A | * | 1/1998 | Nykanen | 359/110 |
| 5,781,177 A | * | 7/1998 | Helot et al. | 345/156 |
| 5,850,189 A | * | 12/1998 | Sakanaka et al. | 340/825.72 |
| 5,903,373 A | * | 5/1999 | Welch et al. | 359/152 |
| 5,982,520 A | * | 11/1999 | Weiser et al. | 359/172 |
| 6,128,117 A | * | 10/2000 | Kim | 359/152 |
| 6,154,300 A | * | 11/2000 | Cho | 359/172 |
| 6,298,047 B1 | * | 10/2001 | Steffes et al. | 370/310 |

* cited by examiner

*Primary Examiner*—Leslie Pascal
*Assistant Examiner*—Hanh Phan

(57) ABSTRACT

Prior art attempts to reduce the power consumption demands of dual infrared transceiver laptop computer designs have included enabling and disabling infrared ports at the user level. This solution requires the computer user to be involved in decision making with respect to infrared peripheral device discovery, and adds complexity to the overall infrared communications experience. Post connection dual IrDA port power management implements the infrared transceiver power down decision making in software, based upon activity inputs from the infrared link controller. Minor changes to the link controller at its device driver improve the user experience and the power consumption in dual IrDA port configurations.

9 Claims, 1 Drawing Sheet

POST CONNECTION DUAL IRDA PORT POWER MANAGEMENT

This application claims priority under 35 USC §119(e)(1) of provisional application No. 60/068,588 filed Dec. 23, 1997

BACKGROUND OF THE INVENTION

Infrared input/output ports for computers allow a wireless connection between the computer and various peripheral devices such as scanners, printers, or personal data organizers (e.g. Sharp Wizard®, PalmPilots®, etc.) The infrared transceiver uses the infrared spectrum for point-to-point data communication, and is typically connected to a computer input/output bus, such as ISA or PCI, through an infrared link controller. Infrared link controllers have evolved from simple Universal Asynchronous Receiver and Transmitter (UART) designs into complex Direct Memory Access (DMA) engines with various logic to support synchronous data transmissions at higher data rates.

An infrared port is not uncommon on desktop computers. Laptop computers will typically provide at least one infrared port. Generally, the transceiver and link controller operate according to the well known standard published by the Infrared Data Association (IRDA) (hereinafter referred to as IrDA) and together the transceiver and link controller implement an IRDA port. For point-to-point IrDA connections between two devices (e.g. a computer and a peripheral device), an awkward orientation of either device may be required in order to achieve a connection therebetween. For instance, if the IRDA port of a laptop exists on its right side, then a peripheral device and its IrDA port must also be located on that side. Prior art attempts to eliminate this equipment layout problem for laptop computers have included locating an additional IrDA port at the opposite end of the laptop's existing IrDA port. However, this approach creates additional problems in that power usage increases. An IrDA transceiver, which is required for each port, has a dynamic operating current which can average around 100 milliamperes (mA) with a peak current of 1 ampere (A). Since power conservation is very important with laptop computer operation due to fact that such computers usually operate on rechargeable batteries, such power dissipation may be unacceptable for prolonged periods of time.

Prior art attempts to reduce the power consumption demands of dual infrared transceiver laptop computer designs have included enabling and disabling infrared ports at the user level. This solution requires the computer user to be involved in decision making with respect to infrared peripheral device discovery, and adds complexity to the overall infrared communications experience.

A need exists to solve the foregoing problems associated with dual IrDA ports on computers.

Figure 1:
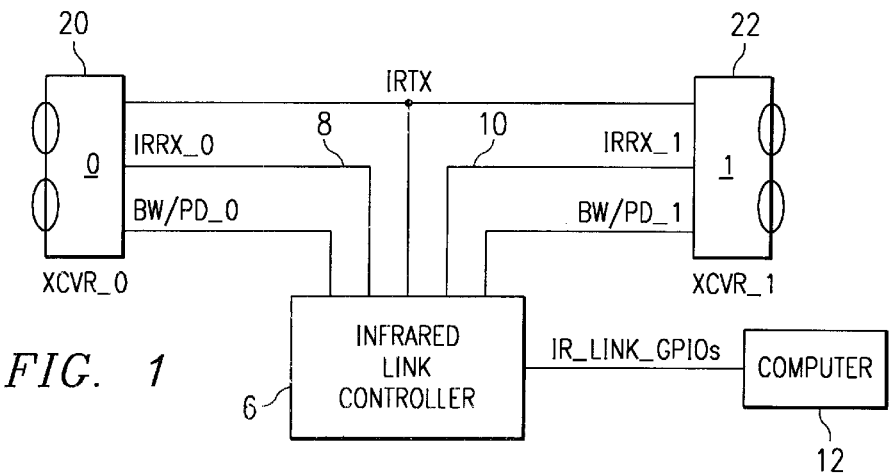
FIG. 1 illustrates a plan view of the invention's dual IRDA transceiver architecture.

Reference numerals in the drawings have been carried forward.

DESCRIPTION OF THE INVENTION

FIG. 1 illustrates a plan view of the invention's dual IRDA transceiver architecture. Preferably, this architecture is implemented on the motherboard of the computer (referenced generally by reference numeral 12) with which it is used. IRDA transceiver 20 (XCVR0) and IRDA transceiver 22 (XCVR1) can be selectively powered down by a bandwidth and power down signal, from infrared link controller 6, which specifies the transmit/receive frequencies and the power state (powered-up or powered down) of the transceiver with a transceiver specific protocol. The bandwidth and power down signal lines for transceivers XCVR0 and XCVR1 are represented by BW0/PD0 8 and BW1/PD1 10 respectively. Communications between controller 6 and the transceivers (XCVR0 and XCVR1) occurs on transmit and receive signal lines (IRTX and IRRX lines). IRTX provides a signal path for a data transmit signal. This signal carries the data output for link controller 6 to the transceivers (XCVR0 and XCVR1) where it is converted to infrared data for wireless transmission to a remote device (personal organizer, etc.). IRRX0 and IRRX1 provide a signal path for a data reception path from a respective transceiver (XCVR0, XCVR1). Infrared data transmitted to transceivers XCVR0 and XCVR1 are converted at these signals to a signal for transmission on a signal along path IRRX0 or IRRX1 . Controller 6 provides a link layer between infrared data and machine language. Thus, controller 6 provides a register interface with computer 12 through its PCI or SCSI bus (not shown).

Figure 2:
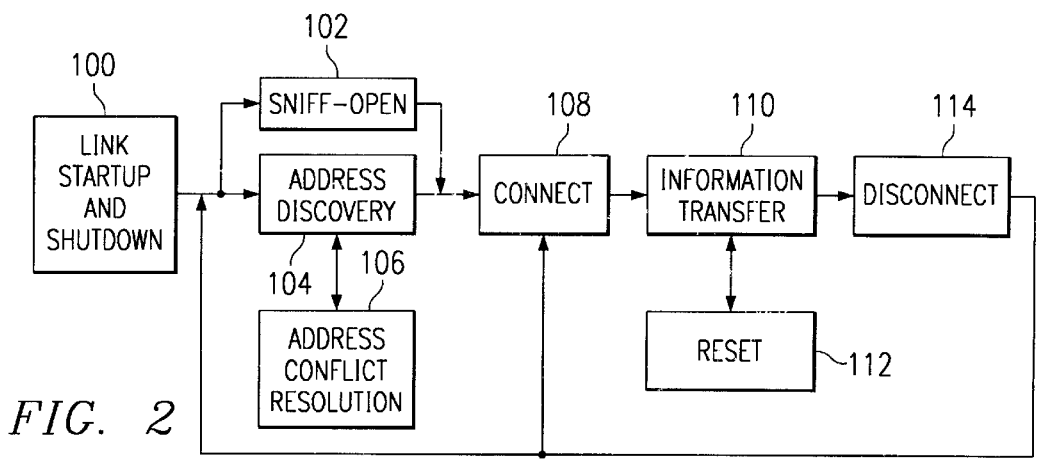
FIG. 2 illustrates a diagram of the IrDA Link Access Protocol (IrLAP).

In order to handle contention problems, the dual transceiver architecture, in its preferred embodiment, resolves contention issues according to the IRDA standard, although other contention schemes are FIG. 2 illustrates a flow diagram of the IrDA Link Access Protocol (IrLAP). Each block of the flow diagram in FIG. 2 is described below in accordance with the IrLAP specification. The link access protocol is used for device discovery, connection, data exchange, etc. as defined by IrDA. The IRLAP shown in FIG. 2 includes post connection port power management. The addition to the IrLAP adds power management value in a dual IrDA port architecture such as that of the invention. Power management can be implement with minor changes to both the IrDA software stack and infrared link controller hardware. The foregoing described invention is not limited to implementations with identical procedural flows as is shown in FIG. 2. For example, an implementation may not support the sniff operation of block 102. The blocks of the IrLAP shown in FIG. 2 are as follows:

Block 100: Link Startup/Shutdown—The infrared link controller operation is enabled/disabled in this procedural block.

Block 102: Sniff Open—This procedure allows a device to broadcast its desire to connect in a way that conserves power.

Block 104: Address Discovery—This procedure is used to determine the device addresses and some other key attributes of all stations that are within communication range.

Black 106: Address Conflict Resolution—This procedure is used when two or more stations that respond to the address discovery procedure are determined to have selected the same device address.

108: Connect—The connection establishment procedure is used to establish a link connection to a station whose device address has been determined using the address discovery procedure.

Block 110: Information Transfer—This procedure governs how IrLAP layers exchange information frames over an established IrLAP connection.

Block 112: Reset—This procedure is used to reset an established connection.

Block 114: Disconnect—This procedure is used to terminate an established IrLAP connection.

The lowest level of hierarchy in the IRDA software stack (the software (which can be resident in the operating system of a computer containing the invention) that controls the IRDA transceiver is typically a framing layer that programs the infrared link controller to send and receive infrared data. The framing layer is an infrared link controller device driver (the device driver is software in the software stack that controls in interfaces with hardware, e.g. the transceiver hardware and it interfaces with the harder that performs the data input/output.

It is workable at the device driver level to determine when an IrDA connection has been established. One implementation recognizes a shift in data rate as a change of connection state. The device driver then queries the infrared controller 6 of FIG. 1 to determine which transceiver was involved in the connection, and it powers down the unused port. After the disconnect phase of IrLAP, the device driver can power up the transceivers, or reset the transceiver power states as directed by a controls set at the user level.

The foregoing described invention is not limited to implementation of post connection IrDA port power management residing at a device driver level. An alternate embodiment of the invention places this control at hierarchically higher layers where connection management is implemented.

A device driver for an infrared link controller will typically not be provided with information such as glue logic and general purpose input/output motherboard signals used to power down transceivers. Thus, the link controller can implement the port transceiver power down circuitry. Further, the link controller can implement port activity indicators which allow the device driver to determine which transceiver is involved in a particular infrared communication with a remote device.

The invention is limited to infrared link controller device drivers which query activity and control transceiver power state via the link controller. Other implementations are contemplated that are not as portable but which can be implemented with system GPIOs or other logic external to the link controller.

Figure 3:
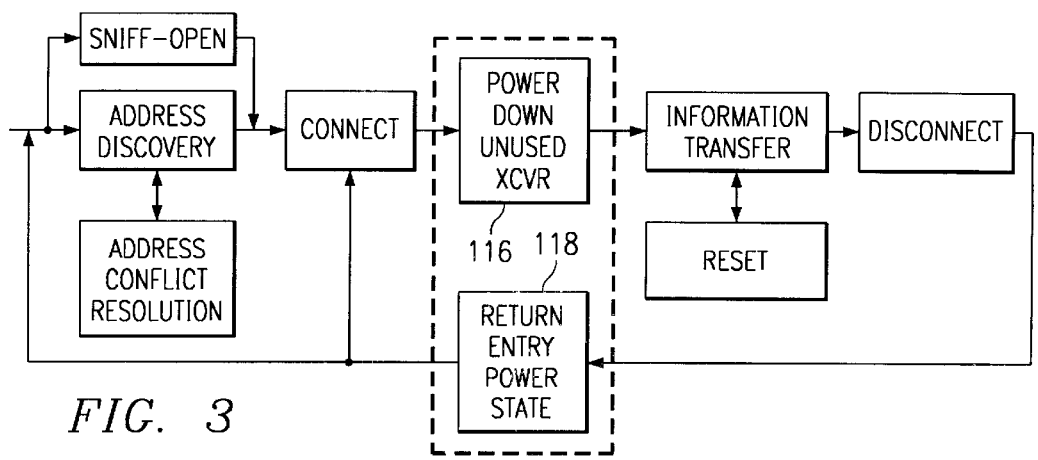
FIG. 3 provides a similar IrLAP illustration as that shown in FIG. 2 with the addition of the post connection port power control, which is highlighted with the dotted box.

FIG. 3 provides a similar IrLAP illustration as that shown in FIG. 2 with the addition of the post connection port power control, which is highlighted with the dotted box. The link startup and shutdown step (FIG. 2, block 100) was not included in this figure for brevity. The blocks not already described above with respect to FIG. 2 are described below.
Block 116: Power Down Unused Transceiver—The link controller is queried for transceiver activity in this procedure, and the unused infrared transceiver is powered down in a dual infrared transceiver implementation.
Block 118: Return Entry Power State—After an established IrLAP connection has been disconnected, the transceivers should be powered to the pre-discovery power state. The pre-discovery power state may be controlled at the user level.

Although the invention has been described in detail herein with reference to its preferred embodiment, it its to be understood that this description is by way of example only, and it is not to be construed in a limiting sense. It is to be further understood that numerous changes in the details of the embodiments of the invention, and additional embodiments of the invention, will be apparent to, and may be made by persons of ordinary skill in the art having reference to this description. It is contemplated that all such changes and additional embodiments are within the true scope and spirit of the invention as claimed below.

We claim:

1. An infrared transceiver system comprising:

an infrared link controller;

a first infrared transceiver;

a second infrared transceiver;

the infrared link controller is coupled to the first and second infrared transceivers for receiving and sending information to the first and second infrared transceivers; and a power management system, said power management system being operable to power down one of said first and second infrared transceivers in response to operation contention between said first and second infrared transceivers.

2. An infrared transceiver system as defined in claim 1, wherein the first and second infrared transceivers are compliant with the Infrared Data Association (IrDA) standard.

3. An infrared transceiver system as defined in claim 1, wherein the power management system is provided by the infrared link controller.

4. An infrared transceiver as defined in claim 1, wherein the power management system powers down the infrared transceiver from among the first and second infrared transceivers which is not involved in communications with an external device as determined by the infrared link controller.

5. An infrared transceiver as defined in claim 1, wherein the infrared link controller provides a link layer between infrared data from the first and second infrared transceivers and a host device.

6. An infrared transceiver as defined in claim 1, wherein a single infrared transmit line (IRTX) couples data provided by the infrared link controller that is to be transmitted by either the first or second infrared transceiver.

7. An electronic device that can communicate with an external device using infrared, the electronic device comprising:

first and second infrared transceivers; a link controller coupled to the first and second infrared transceivers, the link controller determining which of the first or second infrared transceivers is in communication with the external device and automatically powering down the other one of the first or second infrared transceivers that is not in communication with the external device.

8. An electronic device as defined in claim 7, wherein the electronic device comprises a computer.

9. An electronic device as defined in claim 7, wherein the link controller automatically powers up the first or second infrared transceiver that was powered down once the communications between the electronic device and the external device have concluded.

* * * * *